(No Model.)
R. B. EASON.
Earthenware Vessel.
No. 237,505.  Patented Feb. 8, 1881.
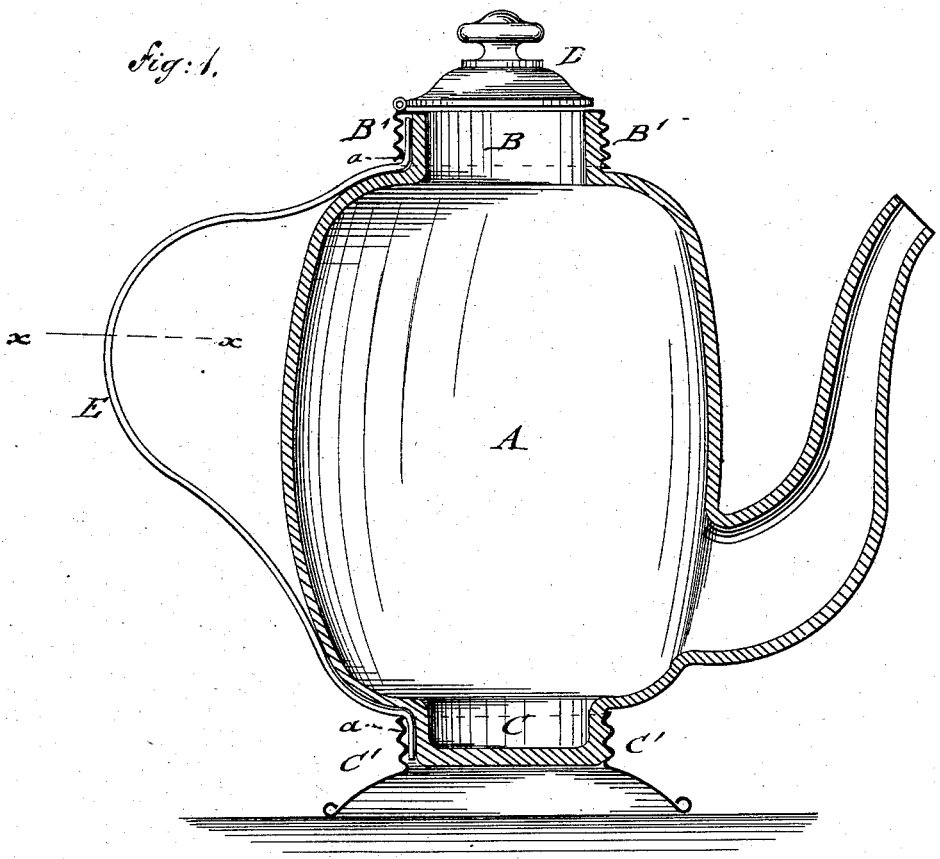
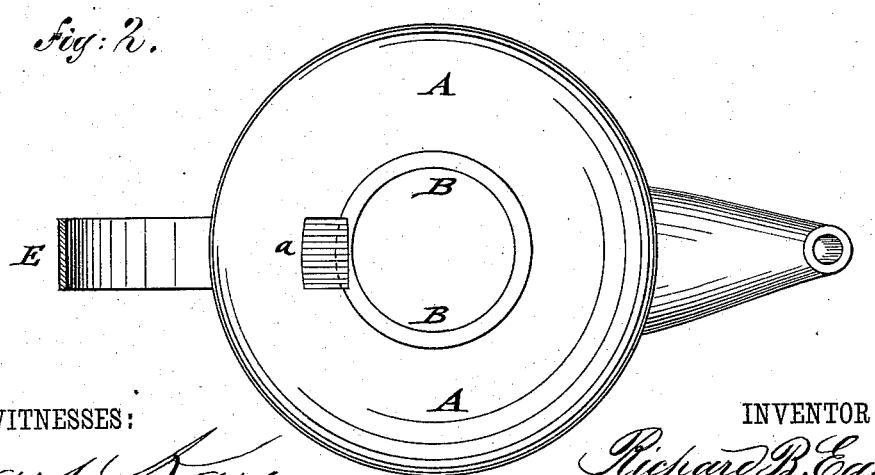
WITNESSES:
Carl Karp
Otto Risch
INVENTOR
Richard B. Eason
BY Paul Goepel
ATTORNEY

UNITED STATES PATENT OFFICE.

RICHARD B. EASON, OF NEW YORK, N. Y., ASSIGNOR TO HIMSELF AND ALFRED A. BRIGGS, OF SAME PLACE.

EARTHENWARE VESSEL.

SPECIFICATION forming part of Letters Patent No. 237,505, dated February 8, 1881.

Application filed December 3, 1880. (No model.)

*To all whom it may concern:*

Be it known that I, RICHARD B. EASON, of the city, county, and State of New York, have invented certain new and useful Improvements in Tea-Pots, of which the following is a specification.

This invention has reference to improvements in the well-known earthenware tea, coffee, and other pots in general use, by which they are better protected against breakage at their bottom and handle parts, at which points at present the cracks or breaks mostly occur.

The invention consists of a tea or other pot which is provided at the neck and bottom part with sheet-metal screw-collars, which retain a handle bent of suitable metal, the ends of the handle being seated in suitable recesses of the body, neck, and bottom of the pot.

In the accompanying drawings, Figure 1 represents a vertical longitudinal section of my improved tea or other pot; and Fig. 2 is a top view of the same, partly in horizontal section, on line $x\ x$, Fig. 1, with lid removed to show the handle-recess in the neck and body of the pot.

Similar letters of reference indicate corresponding parts.

A represents an earthenware tea or coffee pot, molasses-jug, or other culinary vessel, which is provided with exterior screw-threads at the neck B and base C of the same. To the neck B is applied a sheet-metal screw-collar, B', to which the metallic lid D is hinged in the usual manner. To the screw-threaded bottom C is applied, in similar manner as to the neck, a protecting sheet-metal screw-collar, C', which is extended either in upward or in downward or in both directions, so as to form a proper protection for the lower part of the pot. At points diametrically opposite to the spout the neck B and the bottom C are provided with recesses $a$, which are extended into the adjoining parts of the body of the pot, said recesses forming seats for a handle, E, which is securely held on the vessel A by the sheet-metal collars B' and C', after they are screwed over the threaded neck B and base C. The handle E is made of suitable metal, plain or ornamented, and is thereby not liable to break, so that one of the most annoying features in vessels of the class mentioned is obviated. The bottom sheet-metal screw-collar, C, furthermore protects the vessel at the bottom, which, next to the handle, forms the part most exposed to injury. In this manner a convenient, neat, and durable vessel for culinary purposes is obtained, which can be furnished at but little increase over the common earthenware vessels at present in use.

Having thus described my invention, I claim as new and desire to secure by Letters Patent—

1. In a culinary vessel, the combination, with a vessel having a screw-threaded neck and base, of a metallic handle and retaining sheet-metal screw-collars, substantially as set forth.

2. The combination, in a culinary vessel, of the body of the vessel, having a screw-threaded neck and base, and recesses in the neck, base, and adjoining parts of the body, with a handle seated in the recesses and secured by sheet-metal screw-collars, substantially as and for the purpose set forth.

In testimony that I claim the foregoing as my invention I have signed my name in presence of two witnesses this 2d day of December, 1880.

RICHARD B. EASON.

Witnesses:
PAUL GOEPEL,
CARL KARP.